though the objects are secured without it. The radiation zone 14 is surrounded by a shielding zone 15 which is adequate to prevent the escape of harmful quantities of the radiation. A pipe 16 leads from the radiation zone to a separator 17 in which the gases or vapors or solids of the polymer are separated from the monomer in any suitable way, as by a filter, a distillation process, or a settling tank. The product of the polymerization is discharged at 18 and the unused monomer at 19. The used monomer from 19 is returned to the reservoir 10 through pipe 20.

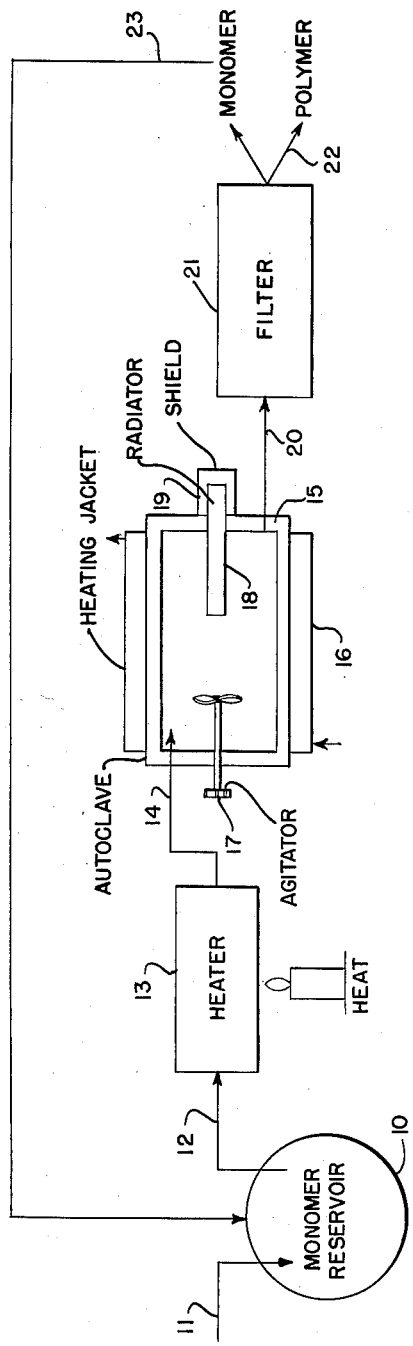

3,102,087
POLYMERIZATION BY GAMMA RAYS AND NOVEL PRODUCTS PRODUCED THEREBY
Michel Andre Jobard, Paris, France, assignor to Compagnie de Saint-Gobain, Paris, France
Filed Jan. 31, 1956, Ser. No. 562,547
Claims priority, application France Feb. 3, 1955
7 Claims. (Cl. 204—163)

This invention relates to the polymerization of monomers whose polymers are insoluble in the monomers, or which are readily separable from the monomers.

It is known to polymerize monomers by means of gamma radiation. It is also known to polymerize monomers by the aid of catalysts. An objection to the polymerization by the use of catalysts is the contamination of the polymer by the catalyst or its residue. An objection to known polymerization processes is the production of considerable quantities of low polymers.

It is an object of this invention to produce polymers which are particularly pure, particularly in that they are free of substantial quantities of decomposition products, contain less low polymers, and are free of catalysts.

A particular object of the invention is to improve the process of making polymers by the use of gamma radiation. An object is to reduce the quantity of decomposition products which are formed during the polymerization of monomers by gamma radiation.

Another object is to produce polymers which are superior to those which are presently known. This superiority arises from superiority in qualities, and from better purity, homogeneity, and freedom from contaminants.

In prior polymerization processes the product has been composed of quite a mixture of polymers of different chain length. It is an object of this invention to produce more homogeneous polymers.

Another object is to enhance the value of gamma radiation polymerization by the use of known catalysts.

The invention also includes new compositions of matter being polymers having superior qualities. The new polymers have excellent mechanical characteristics and very good stability to heat.

An apparatus capable of carrying out this superior process in a satisfactory way has been invented by M. Bognar; is disclosed in a separate application Ser. No. 635,065, filed January 18, 1957.

The known methods for making polymers by gamma radiation were characterized by profound modifications in the polymers after their formation, as for example, the partial depolymerization of some of the polymers and the modification of the structure of others with reticulation.

The present invention is particularly valuable in connection with polymerization in mass, that is to say in in the absence of solvents and diluents. It is also applicable to polymerization in suspension or solution. In the case of polymerization in mass the monomer is maintained in a liquid state in the polymerization system. Such monomers may be liquid at ordinary temperatures and pressures, but they may be maintained in a liquid condition by the use of increased pressure and reduced temperature if necessary.

The invention is particularly applicable to processes in which the polymers are insoluble in the monomers under the conditions of polymerization, such as temperature and pressure, which are employed. Thus, the process is particularly applicable to the polymerization of vinyl chloride, vinylidine chloride, acrylic nitrile, and halogenated ethylenes, such as tetrafluoroethylene and chlorofluoroethylene. These examples are sufficient to indicate the wide applicability of the process.

A particular advantage of this phase of the process is that the polymers are readily separated from the monomers, which permits the immediate recycling of the monomer. According to one characteristic of the invention, the mixture of polymer and monomer issuing from the polymerizing zone is separated and the monomer is returned to the zone of irradiation with or without the addition of new monomer. Thus, the operation is made continuous until all of the monomer in a particular passage has become polymerized.

Any source of radiation emitting gamma rays can be employed, particularly those bodies which are naturally or artificially endowed with radioactivity, it being provided that their radioactive periods should not be too short. Bodies of such limited radioactivity are successful so long as their lives last, but they require replacement or reactivation too frequently, as well as a constant readjustment of the conditions of use, if one would maintain a constant quality and rate of production in the product.

There are two kinds of gamma rays known, which we will call mild and severe, and it is advantageous in this process to employ those which are mild rather than those which are severe. However, both may be employed. The mild rays permit one to radiate the monomers in very intense doses without requiring the use of an exterior protection as heavy as that which must be employed when the severe gamma rays are used.

In order to put the invention into practical use the radioactive sources may be fixed near the center of an enclosure, for example, spherical or cylindrical, through which the monomer is flowed. This enclosure is surrounded with an exterior layer of lead or cement which is sufficient to prevent the gamma rays from passing outside of it. The size of the enclosure and the rate of flow of the monomer are so calculated, as a function of the specific activity of the radiation chosen, and in relation to the molecules of the monomers used, so that one obtains a yield of polymer on an industrial basis without producing those degradations of the polymer which are characteristic of other processes. In particular, the volume of the radiation zone is to be sufficient to provide that the major part of the radiation shall be absorbed by the monomer and not by the exterior protection.

The above and further objects and novel features of the present invention will more fully appear from the following detailed description when the same is read in connection with the accompanying drawing. It is to be expressly understood, however, that the drawing is for the purpose of illustration only and is not intended as a definition of the limits of the invention. Reference for this latter purpose being had primarily to the appended claims.

In the drawing, wherein like reference characters refer to like parts throughout the several views:

The sole FIGURE of the drawing is a diagrammatic illustration of an apparatus for carrying out the invention. In this drawing the numeral 10 refers to a reservoir for the monomer which is maintained under such conditions of temperature and pressure that the monomer is maintained in a liquid state, regardless of whether it be in dispersion, in solution or in mass. An inlet 11 serves to admit fresh monomer to the reservoir. A pipe line 12 serves to transfer monomer from the reservoir to a heater 13, which may be employed if an advantage is gained by carrying out the polymerization at elevated temperature. If, in any case, an advantage were gained by carrying out the polymerization at reduced temperature, a cooler could be substituted at 13 for the heater which is there shown.

Through a pipe line 14 the monomer passes to an autoclave 15 which is provided with a heating or cooling jacket 16 and which is interiorly provided with an agitator 17 and a radiator which may be of any of the types which have been heretofore mentioned. The outside of the element 18, that part which extends beyond the casing 15, is surrounded by a protective shield 19. The polymerization zone which is thus established within the element 15 is surrounded by a wall of lead or cement which is sufficiently thick to prevent the dangerous gamma radiation from escaping into the room. From the chamber 15 through pipe line 20 the mixture of monomer and polymer passes to a filter 21 in which the polymer is separated from the monomer. In the usual case, the polymer will be a solid and the monomer a liquid, but in case both are liquids forming two phases, the separation can be accomplished by decantation, by centrifuge or in other known ways. After the separation in 21 the polymer passes by route 22 to storage and the monomer passes by pipe line 23 back to the reservoir 10 where it is mixed with fresh monomer arriving from line 11 and is again passed through the polymerization zone.

The drawing shows a simplification of the novel apparatus above referred to.

The separation of the polymer from the monomer is easily effected, in the case of polymerization in mass, by simple filtration or drying. This easy separation is still possible in the case of an aqueous suspension of monomers containing polymers, but in this case the coexistence of three phases tends to make the separation more difficult.

The process thus described produces a continuous and even production of polymer of a higher grade than that which has heretofore been known. It is automatic, it is regular, the quality of the product is relatively unvariant, and the process is susceptible of ready change so as to change the property of the polymers, for instance by change in temperature. The personnel are completely protected against the gamma radiation. The only delicate operation occurs during the emplacement of the source of gamma radiation in the zone of irradiation and during its replacement after a period of use, which is the longer as the period of the radioactive substance is itself longer. During that operation all steps may be carried out at a distance well beyond the range of any gamma rays which might by accident escape. We have demonstrated that the liquids which have been exposed to gamma radiation do not have any induced radioactivity. There is therefore no risk involved in the transmission and control of the liquids which issue from the radiation zone.

The rate of conversion in a single passage through the radiation zone is maintained sufficiently low (on the order of 10%) to prevent the formation of low polymers and thus, for 100 parts of monomer by weight which are admitted to the reaction zone there will issue therefrom about 90 parts of monomer and 10 parts of polymer. By this controlled passage through the reaction zone and the recycling of the monomer after separation from the polymer a satisfactory rate of production is achieved and the product produced is of a higher quality than that which has heretofore been known. This superior characteristic can be measured by comparing the mechanical and chemical properties of this polymer, thus produced by a commercial process, with the mechanical and chemical processes of other polymers produced by existing commercial processes.

While the process has a particular advantage in that it produces a polymer of the highest purity when used in the absence of chemical catalysts, it may also be employed in the presence of catalysts of classical type. It may also be used in the presence of adjuvants such as accelerators of polymerization, including those which have heretofore been used in connection with gamma ray polymerization, and in the presence of modifying agents which change the course or the nature of the polymerization, such as chain transfer agents.

The process is also applicable to the manufacture of copolymers and is particularly interesting in this case because it permits one to introduce two or more monomers in variable proportions without it being necessary to introduce a catalyst in advance. Due to the fact that the polymerization proceeds in a very regular way the copolymers thus obtained are much more homogeneous than those which are obtained in the presence of catalyst of classical type.

The following examples are illustrative but are not to be construed as a limitation of the generality of that which has been heretofore said and is hereinafter claimed.

EXAMPLE 1

The polymerization zone was constituted by a closed cylinder of autoclave type having a capacity of 400 cu. cm. into the axis of which penetrated a metallic tube containing the radioactive source. The apparatus included an agitator having paddles which entered through a stuffing box. The radioactive source was composed of radio cobalt having an intensity of 3 curies. The reacaction zone was maintained at 20° C. and vinyl chloride, liquified, was circulated therethrough at a rate of 100 cu. cm. per hour. At the point of discharge the polymer was filtered on a filter arranged within a second enclosure and the monomer was recycled. After five hours of circulation at this rate and under these conditions 8% of the monomer had been polymerized as a polymer of which the K-Wert was between 105 and 110. K-Wert is defined in Cellulose Chemie, 1932, T 13, by Fikentscher.

EXAMPLE 2

Operating as in Example 1 but maintaining the temperature at 0° by cooling through the jacket 16 one obtained under the same conditions the same yield of polyvinyl chloride but having a K-Wert of 130 to 143. This shows the possibility of changing the characteristics of the polymer by regulation of the temperature.

EXAMPLE 3

Operating in the same apparatus as in Example 1 but with a radioactive source having an intensity of 80 roentgens per minute, while maintaining the temperature in the radiation zone at 37°, acrylic nitrile was passed through the reaction zone at a rate of 100 cu. cm. per hr. After 10 hours of irradiation, 5% of the monomer had been transformed to polymer.

EXAMPLE 4

Operating as in Example 3 but with liquid vinyl chloride instead of acrylic nitrile, 6% of the vinyl chloride had been polymerized after three hours. The polymer had a K-Wert of 80–85. This shows the possibility of changing the characteristics of the polymer by changing the characteristics of the irradiation, and of the temperature.

EXAMPLE 5

The polymerization zone was comprised of a cylindrical vessel of 2 liters capacity provided with a double envelope for heating and containing a radio cobalt source of 3 curies intensity. The temperature of the reaction zone was maintained at 55° C. and liquified vinyl chloride was circulated therethrough at a rate of 200 cu. cm. per hour. After 40 hrs. there was gathered on the filter 600 grms. of polymer of K-Wert 67 of which the mechanical properties and the thermal stability were superior to those of the best known commercial polymers. Inasmuch as this is itself a commercial process, the comparison with other commercial products is valid.

EXAMPLE 6

An autoclave having 40 liters capacity received at the center a source of gamma radiation of 3.2 curies intensity. The temperature was maintained at 47.5° by means of a heating jacket. Within the autoclave there were circulated monochlorofluoroethylene containing .1% of benzoyl peroxide as a catalyst. After 64 hrs. of circulation, 2.5 kgs. of polymer was obtained.

EXAMPLE 7

Using the same apparatus as in Example 6 but employing a source of gamma radiations ten times as great, that is to say 32 curies, and maintaining a temperature at 62° while circulating vinyl chloride in mass at a rate of 4 liters per hr. there was produced at the end of 24 hrs. 8 kgs. of polymer of K-Wert 60 of which the content in low polymers was 4% and of which the thermal stability was very high. This stability was measured in the following way: 100 parts of polymer were mixed with 1.5 parts by weight of tri lead stearate and worked on the roll mill for 10 minutes at 165° C. The sheet obtained was broken up and the grains were placed between the plates of a press maintained at 200° C. The press stability is the duration in minutes at 200° between the plates of the press, under a pressure of 50 kgs./cm.² at the end of which the resin shows the start of decomposition.

The grains of polymer are also submitted to a test of thermal stability by means of an apparatus described in the French Patent No. 1,104,462. This gives the furnace stability. The polymer prepared in this example gives a press stability of 20 minutes and a furnace stability of 30.5 minutes whereas polyvinyl chloride of commercial type tested under the same conditions had a press stability of 12½ minutes and a furnace stability of 17 minutes. The commercial type polymer thus compared was of high quality.

EXAMPLE 8

Using the same apparatus and under the same conditions of temperature as in Example 7, but substituting, for the single radioactive source, two different sources situated 15 cm. from each other near the center of the enclosure, the first being of 32 curies and the second of 20 curies, by circulating the liquid vinyl chloride in this irradiation zone a a rate of 5 liters per hour, there was recovered 6 kgs. of polymer after 15 hrs. This polymer possessed the same characteristics of K-Wert and stability as that in Example 7.

the radiation in any one passage through the radiation zone: the process contemplates the separation of the monomer from the polymer after each passage of the monomer through the polymerization zone and the recycling of the monomer to the polymerization zone with or without as yet unirradiated monomer; the process is particularly valuable in cases where the polymers are insoluble in the monomers under the conditions of polymerization as this permits the ready separation of the polymer from the monomer and the immediate recycling of the latter.

The invention also includes the new polymers which are produced and which are of higher purity, greater homogeneity, and superior physical and chemical properties than those which have heretofore been known.

All polymers heretofore produced by the gamma radiation were more or less colored, presumably by gamma ray decomposition of the material. The new polymers produced by this method are colorless, and are thus superior to, and distinguishable from, such prior products. Thus, the polymers in the foregoing examples were all colorless.

A measure of the homogeneity of polymers is obtained by determining the percentage of polymers which are close to a mean, selected molecular weight, as distinguished from those which are remote in molecular weight from such mean. Thus, one may dissolve out polymers having a K-Wert of about 30 and under by a solvent which does not dissolve the heavier polymers, for instance methanol 1 liter, mixed with acetone 4 liters, evaporating the solvent and weighing the low polymers. A homogeneous polymer will be the more homogeneous as its weight is the more composed of polymers near a mean molecular weight and the less composed of very high and very low polymers.

The present polymers have been compared with the best commercial products and are of markedly superior homogeneity. As commercial products are normally superior to laboratory and pilot plant products, these tests amply demonstrate the superior homogeneity of the new products.

As many apparently widely different embodiments of the present invention may be made without departing from the spirit and scope thereof, it is to be understood

*Summary of Examples 1–8*

| Example | Radiation | Duration of Each Exposure | Capacity of Reactor/ Rate of Flow | Temperature | Total time of Circulation Past the Source, Hours |
|---|---|---|---|---|---|
| (1) Vinyl Chloride | Rad. Co. 3c | 4 Hours | 400 cm.³/100 cm.³ per hr. | 20° C., K-wert 105–110 | 5 |
| (2) Vinyl Chloride | same | same | same | 0° C., K-wert 130–143 | 5 |
| (3) Acrylic Nitrile | 80 r./min | same | same | 37° C. K-wert not stated | 10 |
| (4) Vinyl Chloride | same as 3 | same | same | 37° C., K-wert 80–85 | 3 |
| (5) Vinyl Chloride | Rad. Co. 3c | 10 Hours | 2 l./200 cc. per hr. | 55° C., K-wert 67 | 40 |
| (6) Cl—C—H ‖ H—C—F | Gamma 3.2c | | 40 l./? | | 64 |
| (7) Vinyl Chloride | Gamma 32c | 10 Hours | 40 l./4 l. per hr. | 62° C., K-wert 60 | 24 |
| (8) Vinyl Chloride | Gamma (2) 32c and 20c | 8 Hours | 40 l./5 l. per hr. | 62° C., K-wert 60 | 15 |

Examples 7 and 5 give comparative data.

As hereinabove indicated the invention contemplates a process for polymerization by gamma radiation, of polymerizable materials, which comprises continuously passing the monomer, or a mixture of monomers, through an irradiation zone which is subjected to gamma radiation so that while assuring the polymerization of the fraction of the monomeric material the gamma rays do not cause undesirable transformations in the polymer formed. This is accomplished, generally speaking, by limiting the time to which the monomer is exposed to that the invention is not limited to the specific embodiments.

What is claimed is:

1. The continuous method of making polyvinyl chloride that comprises flowing liquid vinyl chloride in bulk, at a rate of about 4 liters per hour, into, through, and out of a zone irradiated by gamma rays of about 32 curies at a temperature of about 62° C., separating monomer from polymer outside the zone, and returning the monomer to the said zone.

2. The continuous method of making polyvinyl chloride that comprises flowing liquid vinyl chloride at a rate of about 100 cc./hr. into, through and out of a zone irradiated by gamma rays of about 3 curies at a temperature of about 20° C., separating monomer from polymer outside the zone, and returning the monomer to the said zone.

3. A method of making polychlorofluoroethylene which comprises flowing monochlorofluoroethylene containing 0.1% benzoyl peroxide catalyst into, through, and out of a zone irradiated by gamma rays of about 3.2 curies at a temperature about 45.7° C., separating monomer from polymer outside the zone, and recirculating the monomer to the zone.

4. The continuous method of making polyvinyl chloride that comprises flowing liquid vinyl chloride in bulk into, through, and out of a zone irradiated by gamma rays of about 3 to about 50 curies at a rate providing a mean time of residence in the zone between 4 and 10 hours, at a temperature not exceeding substantially 62° C., separating polymer from monomer outside the irradiated zone, and again irradiating the separated monomer under similar conditions.

5. The continuous method of making polychlorofluoroethylene that comprises flowing monomeric polychlorofluoroethylene containing about 0.1% benzoyl peroxide catalyst into, through, and out of a zone irradiated by gamma rays of polymerizing intensity at a temperature not substantially over 62° C. and at a rate providing a residence in the zone of about 4 hours, separating monomer from polymer outside the zone, and again irradiating the separated monomer under similar conditions.

6. The method of claim 4 in which the polymerization is terminated after 5% to 10% of polymer has been formed.

7. The method of claim 4 in which a source of radiation between about 3 and about 50 curies is employed and each exposure of the liquid to the radiation is between 3 and 18 hours.

References Cited in the file of this patent
UNITED STATES PATENTS

| | | |
|---|---|---|
| 1,906,402 | Newton | May 2, 1933 |
| 2,345,659 | Downes | Apr. 4, 1944 |
| 2,350,330 | Remy | June 6, 1944 |
| 2,422,919 | Myles | June 24, 1947 |
| 2,508,801 | Sans | May 23, 1950 |
| 2,590,651 | Rosenberg | Mar. 25, 1952 |
| 2,769,804 | Hanson | Nov. 6, 1956 |
| 2,803,599 | Tutwiler et al. | Aug. 20, 1957 |

FOREIGN PATENTS

| | | |
|---|---|---|
| 714,843 | Great Britain | Sept. 1, 1954 |

OTHER REFERENCES

Wall et al.: "Modern Plastics," July 1953, pages 111, 112, 114, 116, 176 and 178. (Copy in Scientific Library.)

Bovey: "The Effects of Ionizing Radiation on Natural and Synthetic High Polymers" (1958), Interscience Publishers, Inc., New York, page 32.